(12) United States Patent
Oh

(10) Patent No.: US 12,036,976 B2
(45) Date of Patent: Jul. 16, 2024

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Tae Dong Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 398 days.

(21) Appl. No.: 17/135,388

(22) Filed: Dec. 28, 2020

(65) Prior Publication Data

US 2021/0197801 A1    Jul. 1, 2021

(30) Foreign Application Priority Data

Dec. 31, 2019    (KR) ......................... 10-2019-0179904

(51) Int. Cl.
| | |
|---|---|
| *B60W 30/06* | (2006.01) |
| *B60W 30/09* | (2012.01) |
| *G05D 1/00* | (2006.01) |
| *G08G 1/14* | (2006.01) |

(52) U.S. Cl.
CPC ............ *B60W 30/06* (2013.01); *B60W 30/09* (2013.01); *G05D 1/0214* (2013.01); *G05D 1/0231* (2013.01); *G08G 1/14* (2013.01); *B60W 2554/4041* (2020.02)

(58) Field of Classification Search
CPC .... B60W 30/06; B60W 30/09; G05D 1/0214; G05D 1/0231; G08G 1/14

USPC ............................................................ 701/2
See application file for complete search history.

(56) References Cited

U.S. PATENT DOCUMENTS

| | | | | |
|---|---|---|---|---|
| 2011/0102197 | A1* | 5/2011 | Herwich ................. | E01F 9/559 340/932.2 |
| 2012/0188100 | A1* | 7/2012 | Min ....................... | G08G 1/146 340/932.2 |
| 2014/0046506 | A1* | 2/2014 | Reichel ................ | G05D 1/0289 701/2 |

(Continued)

FOREIGN PATENT DOCUMENTS

| | | |
|---|---|---|
| DE | 10 2012 222 562 A1 | 6/2014 |
| DE | 10 2014 218 456 A1 | 3/2016 |
| DE | 10 2017 210 961 A1 | 1/2019 |

(Continued)

OTHER PUBLICATIONS

European Search Report issued May 18, 2021 in corresponding European Patent Application No. 20217544.4.

(Continued)

*Primary Examiner* — Peter D Nolan
*Assistant Examiner* — Luke Huynh
(74) *Attorney, Agent, or Firm* — Fox Rothschild LLP

(57) ABSTRACT

A system, method, infrastructure, and vehicle for automated valet parking are provided. The method includes initiating an automated valet parking procedure for a vehicle, providing the vehicle with a target position and a first guide route leading to the target position, detecting an unexpected incident based on situation information, and providing the vehicle with a second guide route to deal with the unexpected incident.

19 Claims, 13 Drawing Sheets

(56) References Cited

U.S. PATENT DOCUMENTS

2018/0024566 A1* 1/2018 Rakshit ................ H04W 4/029
                                                                                  701/2
2018/0170365 A1* 6/2018 Shani .................... B60W 30/06

FOREIGN PATENT DOCUMENTS

| EP | 3 539 851 A1 | 9/2019 |
| JP | 2018-503893 A | 2/2018 |

OTHER PUBLICATIONS

Office Action issued in corresponding Japanese Application No. JP 2020-217353.
Office Action issued Mar. 30, 2024 in corresponding Chinese Application No. 202011622940.6.

* cited by examiner

[Fig. 1]
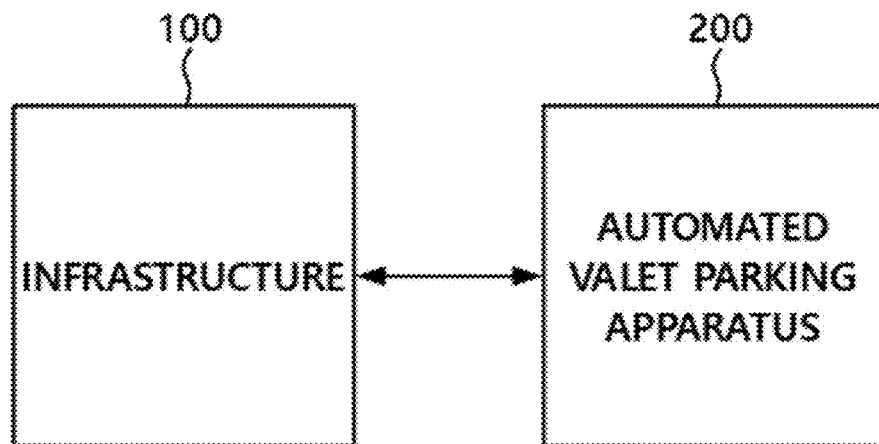
[Fig. 2]
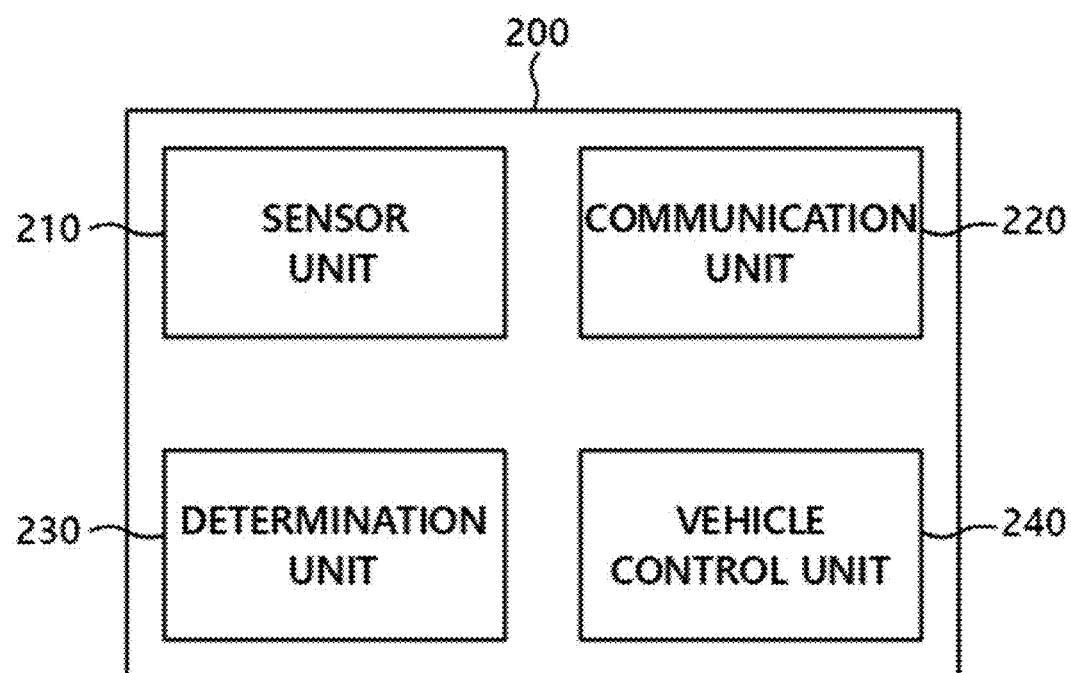

[Fig. 3]
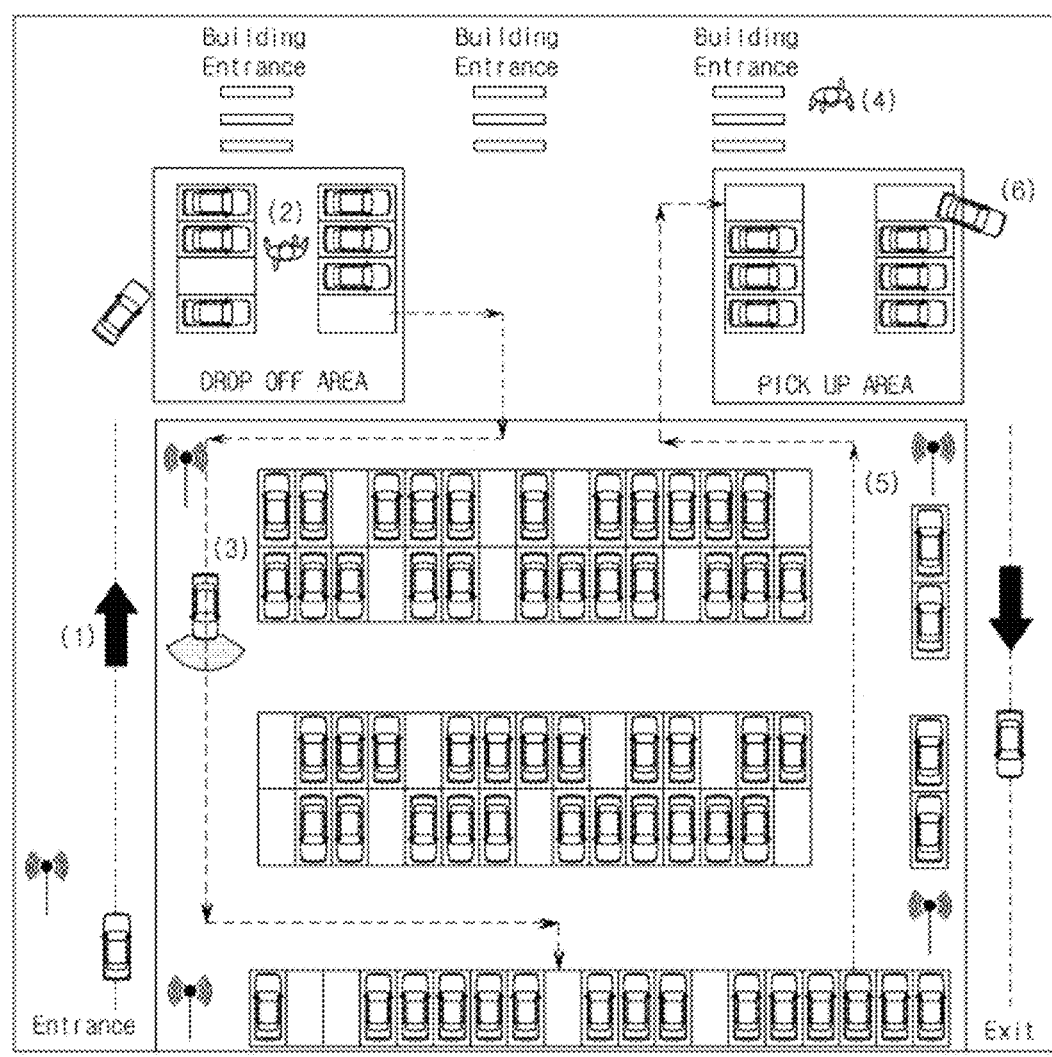

[Fig. 4A]

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra<br>• Determine human or animal inside the vehicle |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicle and obstacles (TBD), and monitor safety driving and parking operation of each vehicle (supervise) | • Estimate its own position<br>• Inform the infra of its estimated position/with the accuracy and frequency specified below (TDB)<br>• Inform the infra of its own status<br>• Detect the following obstacles (TBD) |
| <5> AUTONOMOUS PARKING | | • Park and Stop the vehicle at the target position designated by infra (equivalent to PAPS parking requirements) |

[Fig. 4B]

| Step | infra | vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• immediately decelerate at the rate of (TBD) m/s² and stop, when the following conditions are met<br>(1) vehicle received an instruction from infra for E/S<br>(2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

[Fig. 5]

| DATA | Contents | Transmit(T)/Receive(R) Infrastructure | Transmit(T)/Receive(R) Vehicle | Regularly(F)/Event(E) Transmission | Note |
|---|---|---|---|---|---|
| (1) Vehicle qualification information | ID number (VIN) to identify each vehicle | R | T | E When entering the parking | |
| (2) Automated driving preparation instruction | - | T | R | E Right before automated driving start | |
| (3) Vehicle information notification | Vehicle state (normal stop/driving/emergency stop, etc.), Vehicle position(should) | R | T | F(1Hz) | This is also used for communication fault check by the vehicle |
| (4) Vehicle information response | - | T | R | F(1Hz) | |
| (5) Target position-guide route Delivery | Target position · Passing point location/Permitted time to pass through the point, Maximum speed | T | R | E After automated driving instruction | |
| (6) Driving boundaries delivery | A group of lines to surround the permitted driving area | T | R | E After automated driving preparation instruction | |
| (7) Automated driving start instruction | | T | R | E After delivery of guide route and driving boundaries, when restarting after emergency stop | |
| (8) Emergency stop instruction | - | T | R | E | |
| (9) Vehicle control release instruction | - | T | R | E | |

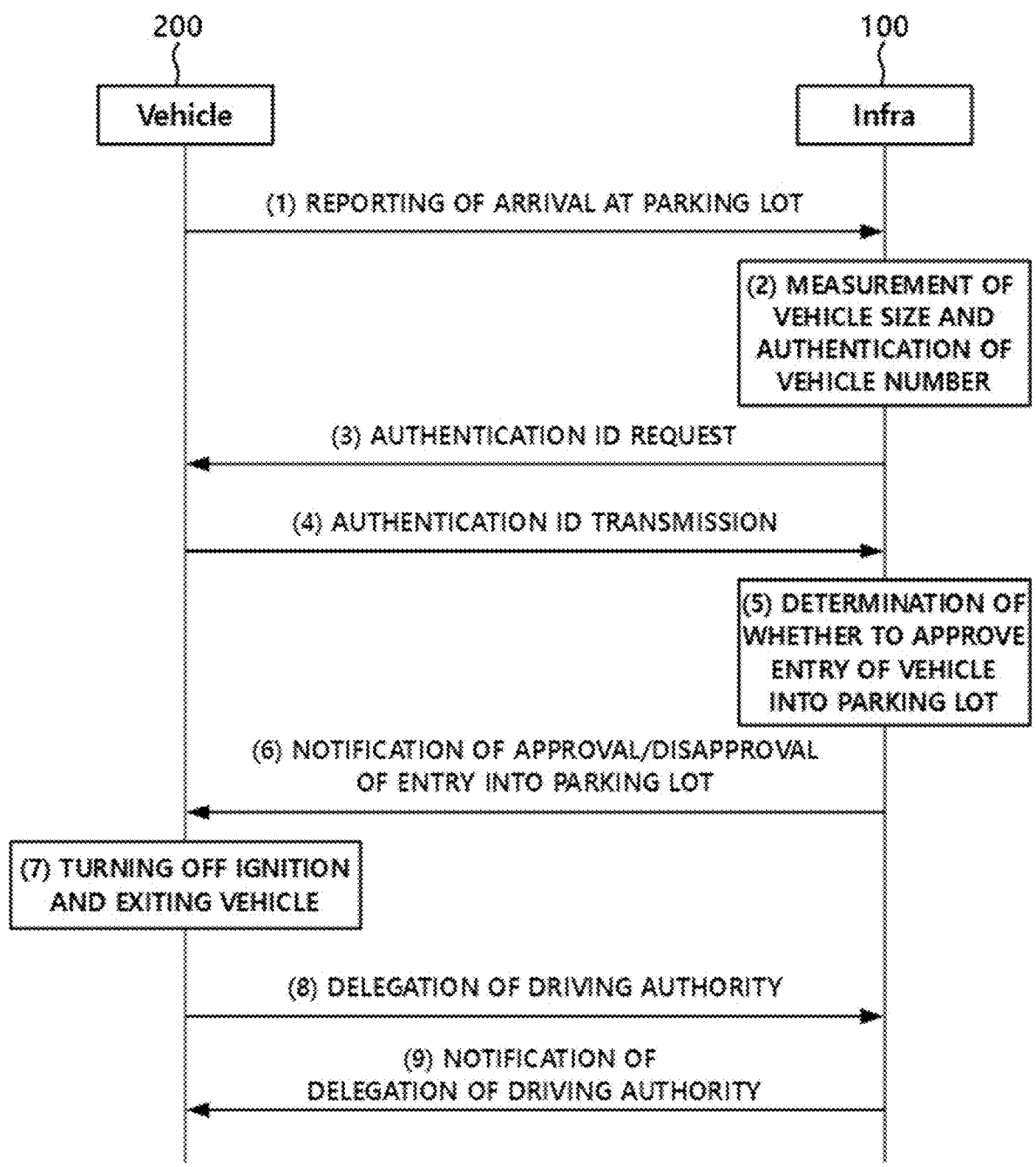

[Fig. 7]
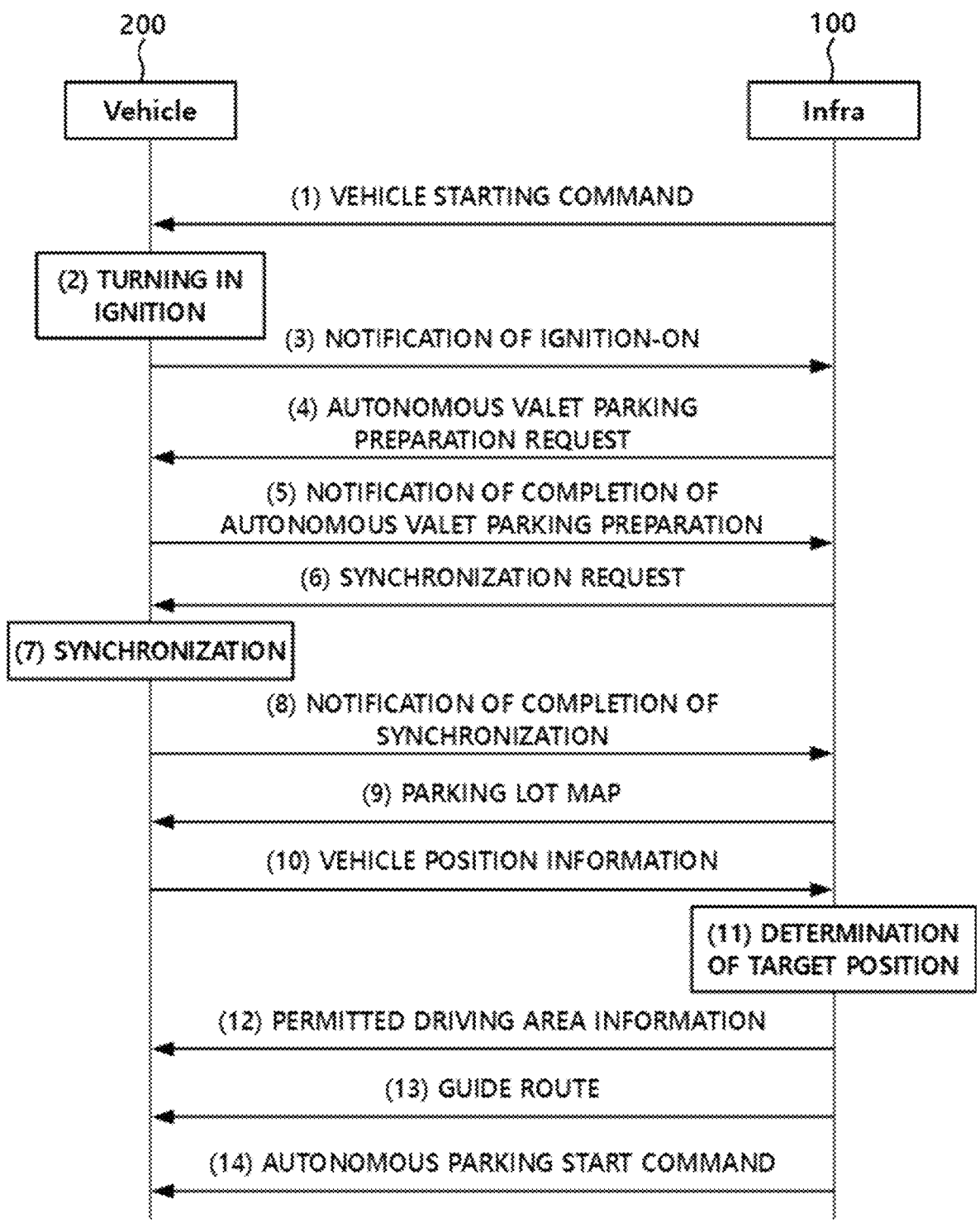

[Fig. 8]
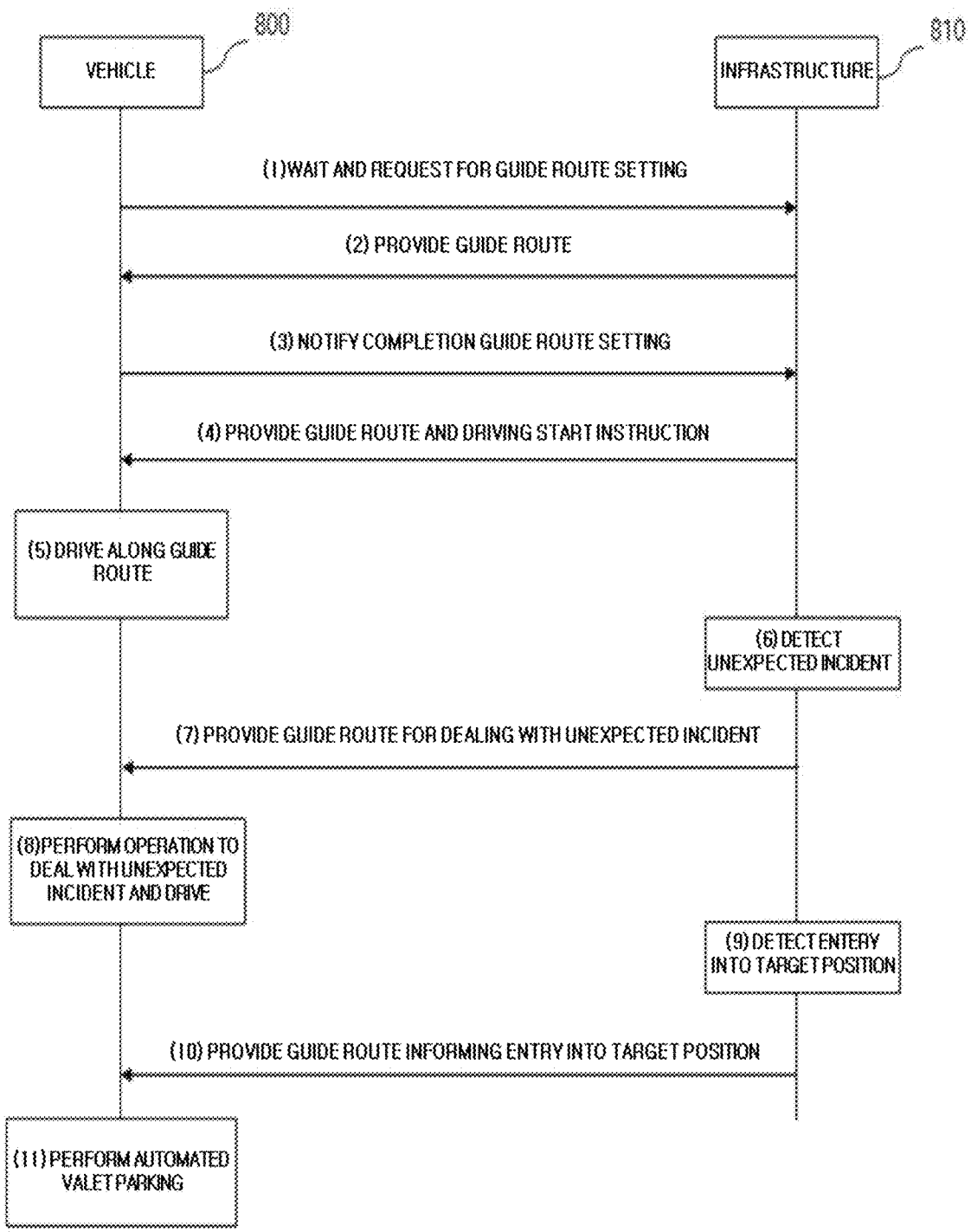

[Fig. 9]
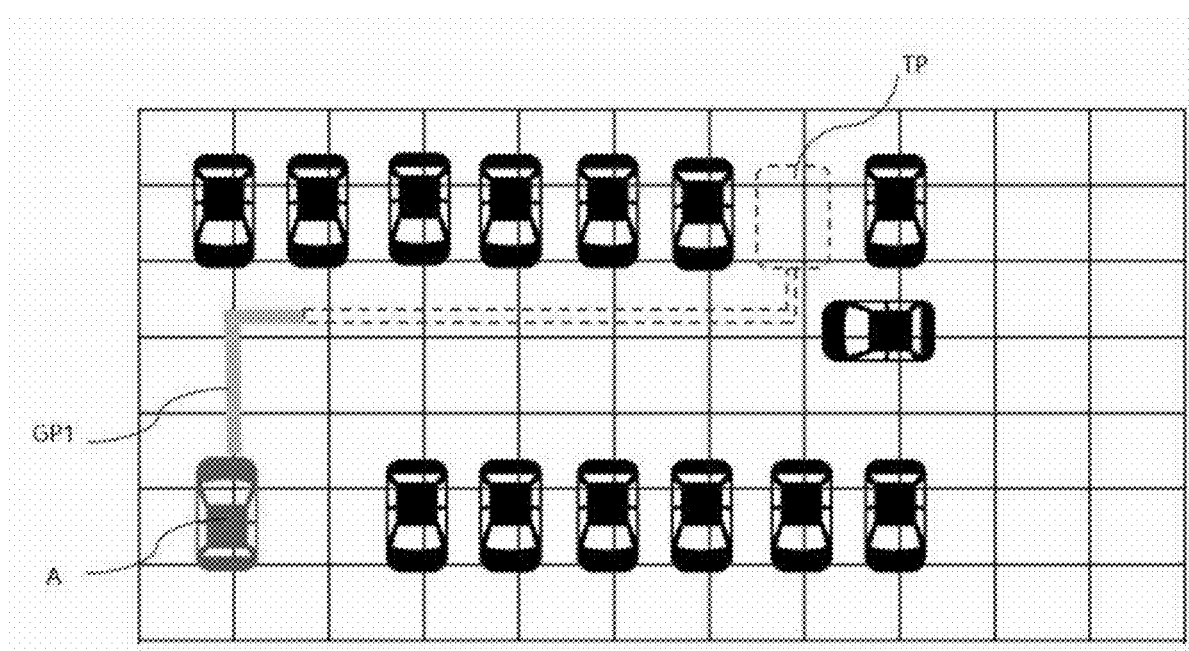

[Fig. 10]
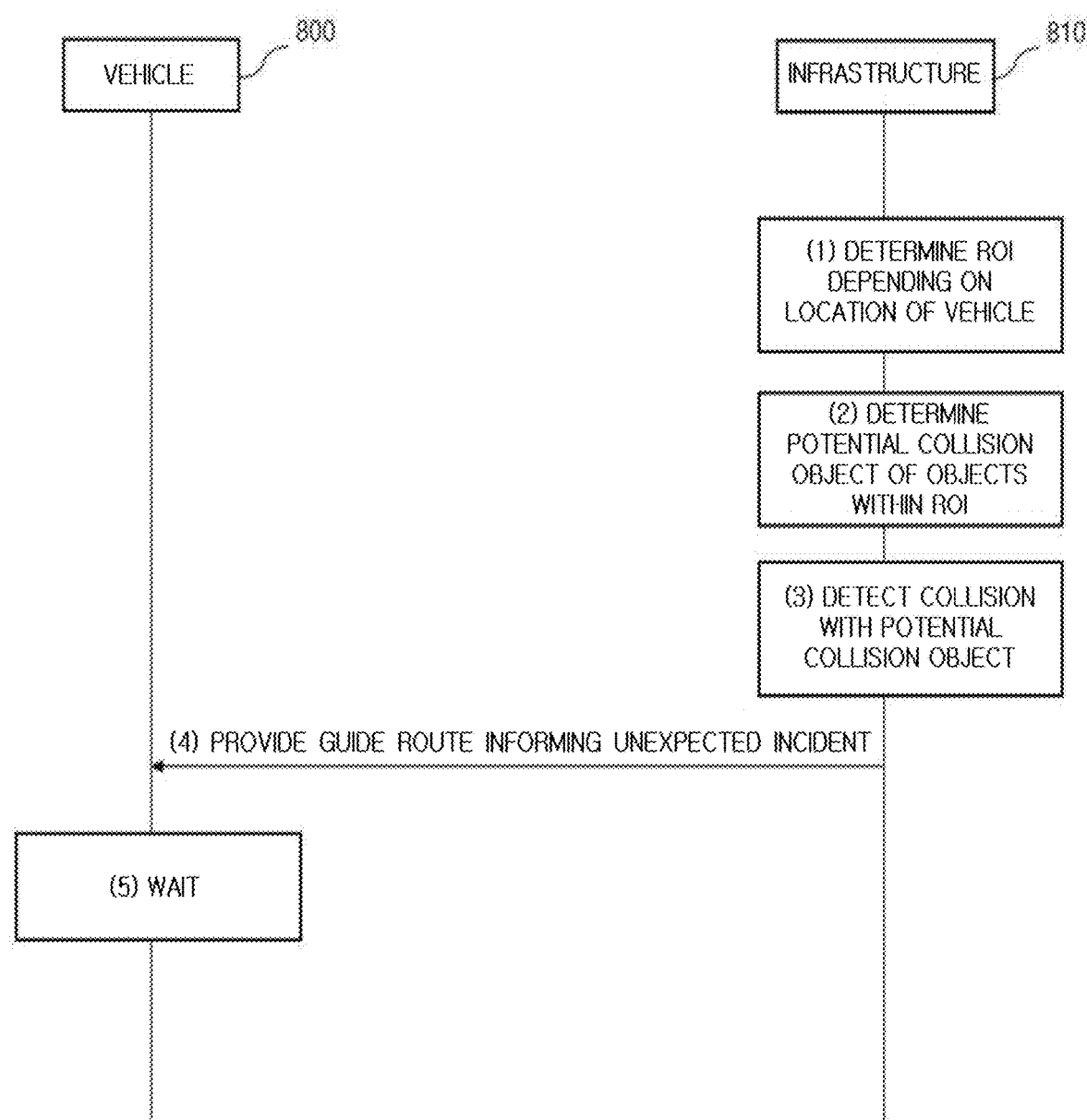

[Fig. 11]
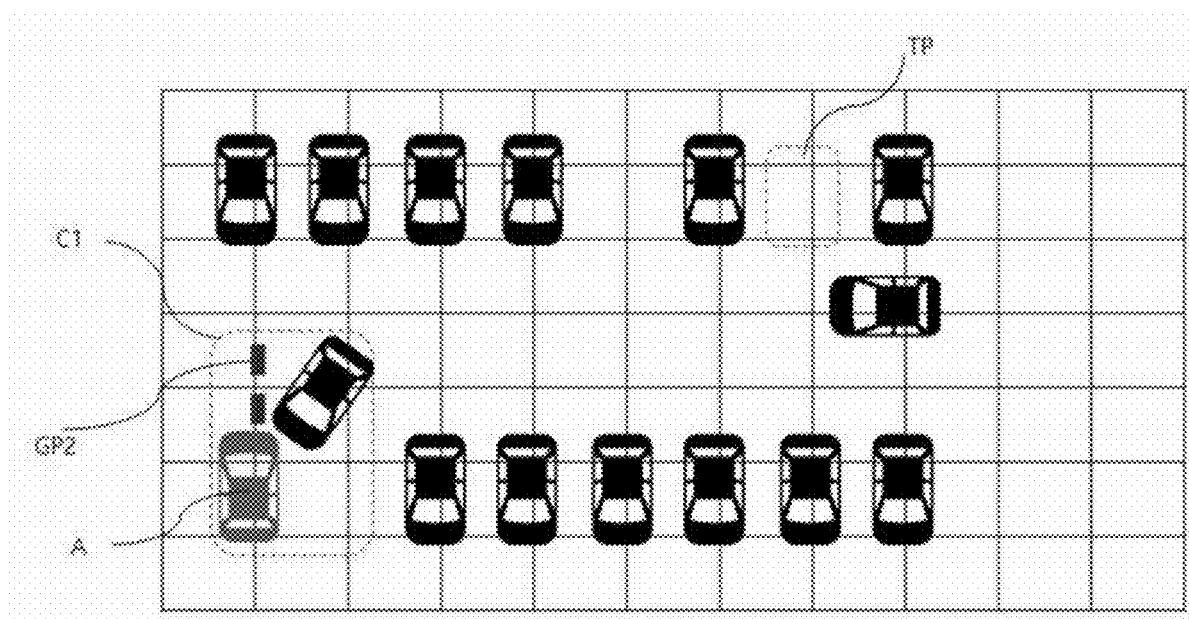

[Fig. 12]
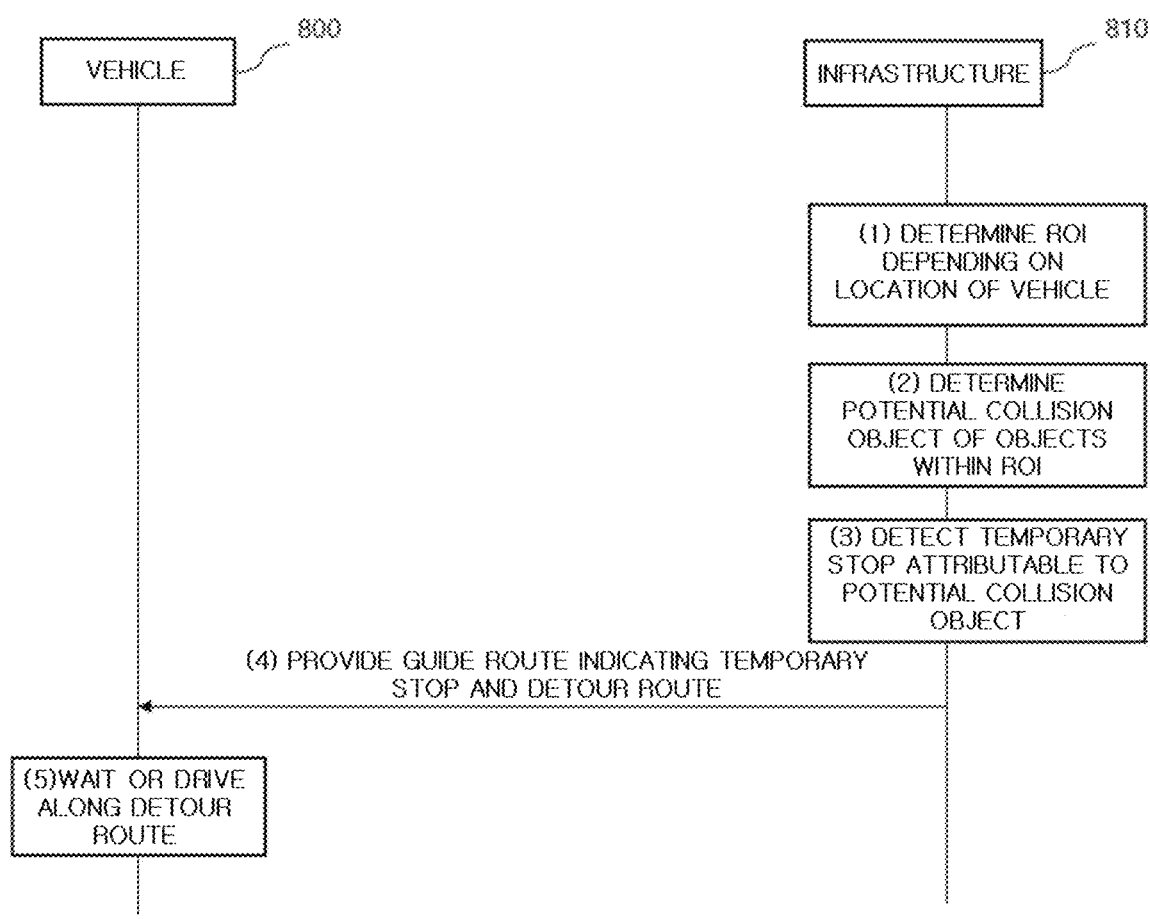

【Fig. 13】
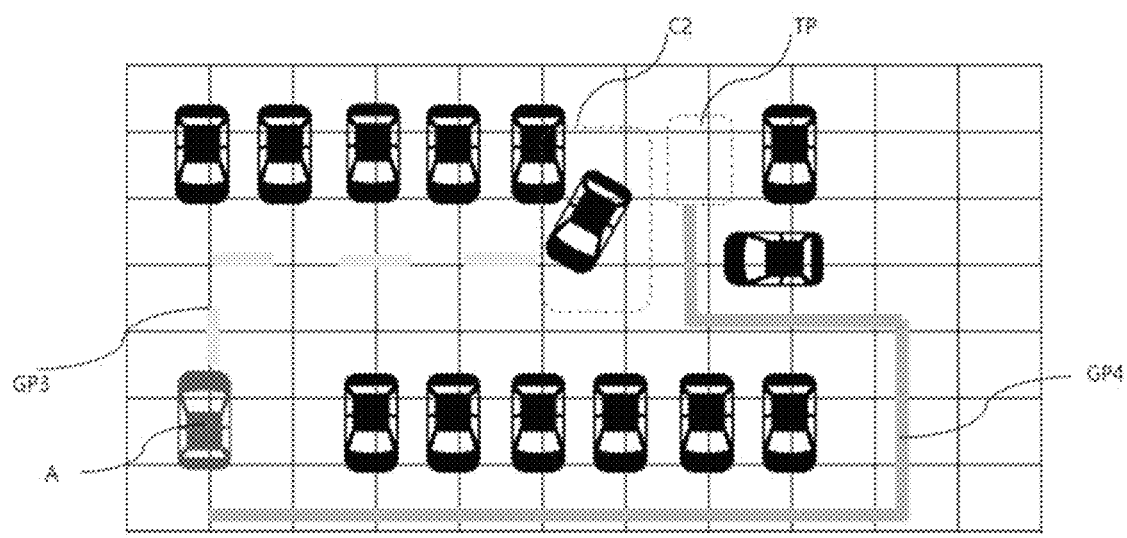
【Fig. 14】
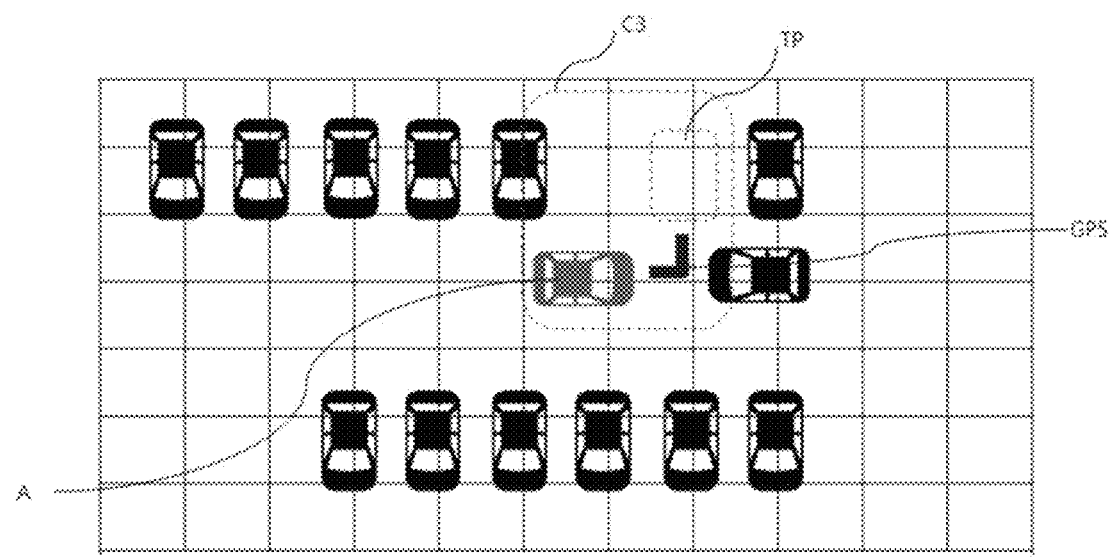

SYSTEM, METHOD, INFRASTRUCTURE, AND VEHICLE FOR AUTOMATED VALET PARKING

CROSS-REFERENCE TO RELATED APPLICATION

The present application claims priority to and the benefit of Korean Patent Application No. 10-2019-0179904, filed Dec. 31, 2019, the entire contents of which is incorporated herein for all purposes by this reference.

TECHNICAL FIELD

The present disclosure relates to an automated valet parking system, an automated valet parking method, and an automated valet parking infrastructure, and a vehicle having an automated valet parking feature.

BACKGROUND

Many modern cities suffer from various problems associated with vehicle parking. For example, there is a risk of a car collision in a parking lot. For parking in crowded places such as a large shopping center, people spend much time to enter a parking lot around the destination due to traffic congestion. Furthermore, it also takes time to locate an empty parking spot even after entering a parking lot. In addition, there is inconvenience that a driver has to move to a spot at which his or her vehicle is parked at the time of leaving the visited area or that a driver often has difficulty in retrieving his or her vehicle due to forgetting the parking spot where his or her vehicle is parked.

SUMMARY

The present disclosure provides an automated valet parking service by which a driver can leave his or her vehicle at a predetermined drop-off area when vising a place and the vehicle autonomously moves to and parks at an empty parking spot in a parking lot.

The present disclosure also provides an automated valet parking service by which a vehicle that has been parked autonomously moves from a parking spot to a predetermined pickup area so that the driver can conveniently leave the parking lot.

Moreover, the present disclosure provides an autonomous valet parking method in which a vehicle is provided with a first guide route leading to a target position when an unexpected incident occurs.

The technical problems to be solved by the present disclosure are not limited to the above-mentioned ones, and other technical problems which are not mentioned above will be clearly understood from the following description by those skilled in the art.

One aspect of the present disclosure provides an operation method of an infrastructure that supports an automated valet parking service, the method including: initiating an automated valet parking procedure for a vehicle; providing the vehicle with a target position and a first guide route leading to the target position; detecting an unexpected incident on the basis of situation information; and providing the vehicle with a second guide route that guides the vehicle to the target position to deal with the unexpected incident.

Another aspect of the present disclosure provides a method of performing automated valet parking, the method including: initiating an automated valet parking procedure for a vehicle; by an infrastructure, providing the vehicle with a target position and a first guide route leading to the target position; by the vehicle, autonomously driving along the first guide route; by the infrastructure, determining whether an unexpected incident occurs on the basis of situation information.

An automated valet parking system according to embodiments of the present disclosure provides a vehicle with a guide route on the basis of situation information so that the vehicle having an automated valet parking feature can safely reach a target position even when an unexpected incident occurs while autonomously driving to the target position. To this end, objects within a parking lot can recognize unexpected incidents occurring in the parking lot.

The effects and advantages that can be achieved by the present disclosure are not limited to the ones mentioned above, and other effects and advantages which are not mentioned above but can be achieved by the present disclosure can be clearly understood by those skilled in the art from the following description.

DRAWINGS

FIG. 1 is a diagram illustrating an automated valet parking system in one form of the present disclosure;

FIG. 2 is a diagram illustrating an autonomous valet parking apparatus in one form of the present disclosure;

FIG. 3 is a conceptual diagram illustrating an automated valet parking system and an automated valet parking method in one form of the present disclosure;

FIGS. 4A and 4B are diagrams illustrating operations performed by a vehicle and an infrastructure for automated valet parking, in one form of the present disclosure;

FIG. 5 is a diagram illustrating a communication process performed by a vehicle and an infrastructure for automated valet parking, in one form of the present disclosure;

FIG. 6 is a diagram illustrating a communication process performed by a vehicle and an infrastructure for automated valet parking, in one form of the present disclosure;

FIG. 7 is a diagram illustrating a communication process performed by a vehicle and an infrastructure for automated valet parking, in one form of the present disclosure;

FIG. 8 is a block diagram illustrating a method of providing a guide route, the method being performed by a vehicle and an infrastructure in one form of the present disclosure;

FIG. 9 is a diagram illustrating a guide route that guides a vehicle to a target position that is an available parking spot, in one form of the present disclosure;

FIG. 10 is a block diagram illustrating a method of providing a guide route, the method being performed by a vehicle and an infrastructure in one form of the present disclosure;

FIG. 11 is a diagram illustrating a guide route used when a collision event occurs, in one form of the present disclosure;

FIG. 12 is a block diagram illustrating a method of providing a guide route, the method being performed by a vehicle and an infrastructure in one form of the present disclosure;

FIG. 13 is a diagram illustrating a guide route used when a temporary stop event occurs, in one form of the present disclosure; and FIG. 14 is a diagram illustrating a guide route that guides a vehicle to a target position, in one form of the present disclosure.

DETAILED DESCRIPTION

Herein below, exemplary embodiments of the present disclosure will be described in detail with reference to the accompanying drawings. The construction and operational effects of the present disclosure will be clearly understood from a detailed description given below. Prior to describing exemplary embodiments of the present disclosure in detail, it is noted that throughout the drawings the same components will be denoted by the same reference numerals when possible and a detailed description about components and functions that are well known in the art will be omitted when the subject matter of the present disclosure would be obscured by the description.

Terms and words used in the following detailed description of the present disclosure will be defined first.

The term "driver" refers to a person who uses an automated valet parking service provided by an automated valet parking system.

The term "driving authority" refers to the authority to control vehicle operations. The term "vehicle operation" refers to an operation such as steering, accelerating, braking, gear shifting, engine activation/deactivation, and vehicle door locking/unlocking.

The term "vehicle" refers to a vehicle having an automated valet parking feature.

The term "control center" refers to a facility that can monitor vehicles parked in a parking lot. The control center determines a target position, a guide route, a permitted driving area, or the like and transmits various instructions including a driving start instruction and an emergency stop instruction to a vehicle.

The term "infrastructure" includes a parking facility and sensors installed in the parking facility. Alternatively, in some cases, the term "infrastructure" may refer to a control center that controls gates of a parking lot, vehicles existing within a parking lot, etc.

The term "target position" refers to one of the parking spots available for parking. Alternatively, the term "target position" refers to a pickup area where a driver takes his or her vehicle to leave the parking lot.

The term "guide route" refers to a route that guides a vehicle to reach a target position. For example, in a vehicle parking session, the guide route is a route that guides a vehicle from a drop-off area to an empty parking spot. For example, the guide route is provided in the form of instructions. Specifically, it will include instructions such as "move straight 50 m" and "turn left at the next corner".

The term "driving route" refers to a driving path along which a vehicle needs to travel.

The term "permitted driving area" refers to an area where a vehicle can travel within a parking lot. For example, the permitted driving area includes a driving lane. The permitted driving area is defined with barrier walls, parked vehicles, lines, etc.

FIG. 1 is a diagram illustrating an automated valet parking system according to one embodiment of the present disclosure. Referring to FIG. 1, an automated valet parking system 10 includes an infrastructure 100 and an automated valet parking apparatus 200. The term "automated valet parking apparatus" may be referred to as an autonomous valet parking device.

The infrastructure 100 refers to an apparatus or system for operating, managing, and controlling constituent elements involved in automated valet parking. For example, the infrastructure 100 may be a facility in a parking lot. According to embodiments, the infrastructure 100 includes sensors, communication devices, alarm devices, display devices, and a server device that controls those devices. Alternatively, in some cases, the term "infrastructure" may refer to a control center that controls gates of a parking lot, vehicles existing within a parking lot, etc.

The automated valet parking apparatus 200 refers to a vehicle that can perform automated valet parking. Alternatively, the automated valet parking apparatus 200 may refer to a constituent element or a set of constituent elements of a vehicle, which are required to perform automated valet parking.

FIG. 2 is a diagram illustrating an autonomous valet parking device according to one embodiment of the present disclosure. Referring to FIG. 2, the automated valet parking apparatus (for example, vehicle 200) includes a sensor unit 210, a communication unit (for example, a communication, circuit, and/or a transceiver) 220, a determination unit (for example, a processor)) 230, and a vehicle control unit 240.

The sensor unit 210 monitors the surroundings of the automated valet parking apparatus 200. According to embodiments, the sensor unit 210 measures the distance between the automated valet parking apparatus 200 and a specific object or senses a nearby object around the automated valet parking apparatus 200. For example, the sensor unit 210 includes at least one of the sensors selected from among an ultrasonic sensor, a radar sensor, a LiDAR sensor, a camera, an infrared sensor, a thermal sensor, and a millimeter wave sensor.

The sensor unit 210 is configured to transmit collected data to the communication unit 220 or to the vehicle control unit 240.

The communication unit 220 communicates data with the infrastructure facility 100. This communication is called vehicle-to-infra (V2I) communication. The communication unit 220 communicates data with other vehicles. This communication is called vehicle-to-vehicle (V2V) communication. The V2I communication and the V2V communication are collectively called vehicle-to-everything (V2X) communication. According to embodiments, the communication unit 220 receives data such as a target position, a guide route, a driving route, an instruction, or the like from the infrastructure 100, processes the received data, and transmits data generated through the processing to the determination unit 230. The communication unit 220 transmits data collected and generated by the automated valet parking apparatus 200 to the infrastructure 100. According to embodiments, the communication unit 220 exchanges data with the automated valet parking apparatus 200.

The communication unit 220 receives and transmits the data according to a wireless communication protocol or a cable communication protocol. Examples of the wireless communication protocol include but are not limited to wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include but are not limited to wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The determination unit 230 controls the overall operation of the automated valet parking apparatus 200. The determination unit 230 controls the vehicle control unit 240 on the basis of the data transmitted from the sensor unit 210 and the communication unit 220. According to embodiments, the determination unit 230 generates a control signal to adaptively control the vehicle control unit 240 according to the data transmitted from the infrastructure 100 and transmits the control signal to the vehicle control unit 240.

That is, the determination unit 230 refers to a device that performs a series of computations or that makes a series of determinations to control the automated valet parking apparatus 200 for the purpose of automated valet parking. For example, the determination unit 230 may be a processor capable of executing a software program including instructions for performing automated valet parking for a vehicle. Examples of the determination unit 230 include but are not limited to a central processing unit (CPU), a microcontroller unit (MCU), a microprocessor unit (MPU), an application specific integrated circuit (ASIC), a field programmable gate array (FPGA), and a graphic processing unit (GPU).

The vehicle controller 240 controls the automated valet parking apparatus 200 according to the control of the determination unit 230. According to some embodiments, the vehicle controller 240 controls the automated valet parking apparatus 200 (for example, vehicle 200) in response to a control signal transmitted from the determination unit 230. Specifically, the vehicle controller 240 controls various vehicle operations such as driving, stopping, re-driving, steering, accelerating, decelerating, parking, lighting, flashing, alarm sounding, etc.

That is, it is noted that the vehicle controller 240 can perform all functions required to control the operations of the automated valet parking apparatus 200. Specifically, the vehicle controller 240 controls a driving unit, a braking unit, a steering unit, an acceleration unit, an alarm unit, and a flasher of the automated valet parking apparatus 200.

On the other hand, although not explicitly described herein, it is noted that the operations and/or functions of the automated valet parking apparatus 200 are performed by the conjunction of one or more components selected from among the sensor unit 210, the communication unit 220, the determination unit 230, and the vehicle control unit 240.

FIG. 3 is a conceptual diagram illustrating an automated valet parking system and an automated valet parking method according to embodiments of the present disclosure.

Referring to FIG. 3, in step (1), a driver drives a vehicle (for example, automated valet parking apparatus 200 of FIG. 1) to enter a parking lot and to reach a drop-off area in the parking lot.

In step (2), when arriving at the drop-off area, the driver gets out of the vehicle and delegates the authority to drive or control the vehicle to an infrastructure (for example, infrastructure 100 of FIG. 1).

In step (3), the infrastructure searches for available parking spots in the parking lot and designates one of the available parking spots for the vehicle. The infrastructure determines a guide route leading to the designated parking spot. After the parking spot and the guide route are determined, the vehicle autonomously drives in accordance with the guide route until reaching the designated parking spot and performs autonomous parking at the designated parking spot.

In step (4), the driver moves to a pickup area where the vehicle will be returned to the driver to leave the parking lot.

In step (5), the infrastructure determines a suitable target position. Specifically, in this step, the suitable target position may be one of empty parking spots within the pickup area. In addition, the infrastructure determines a guide route which will guide the vehicle to the target position. After the target position and the guide route are determined and transmitted to the vehicle, the vehicle autonomously drives in accordance with the guide route until reaching the target position and performs autonomous parking at the target position.

In step (6), the driver arrives at the pickup area, takes over the authority to control the vehicle, and then drives the vehicle toward the exit of the parking lot.

FIGS. 4A and 4B are diagrams illustrating operations performed by a parking infrastructure and a vehicle for automated valet parking, according to one embodiment of the present disclosure.

Item (1) describes the operation of the infrastructure (for example, the infrastructure 100 of FIG. 1) and the operation of the vehicle (for example, the automated valet parking apparatus 200 of FIG. 1) at the time of initiating an automated valet parking procedure. The infrastructure identifies a driver and a vehicle and determines whether the driver and the vehicle are qualified for parking in a specific parking place. For example, the infrastructure determines whether the driver is qualified by reading an identification number (ID) or a password that is presented by the driver. The infrastructure determines whether the vehicle is qualified by reading a vehicle identification number which is a unique number of the vehicle. The vehicle can activate and deactivate the engine by itself. The vehicle can turn on and off the power supply by itself. A state in which the vehicle engine is deactivated and the power supply is turned on is referred to as an accessory-on (ACC-On) state. The activation/deactivation of the engine and the on/off operation of the power supply may be performed according to external instructions received from the infrastructure or may be performed without depending on the external instructions. The vehicle can lock and unlock the doors by itself. The locking and unlocking of the vehicle doors may be performed according to external instructions received from the infrastructure or may be performed without depending on the external instructions. Preferably, the vehicle locks the vehicle doors before performing automated parking. Preferably, the driving authority for the vehicle is delegated to the infrastructure from the vehicle. The driving authority means an authority to control the operations of the vehicle. The vehicle operations include steering, accelerating, braking, gear shifting, engine activation/deactivation, and door locking/unlocking. Since the driving authority for the vehicle is delegated to the infrastructure, the infrastructure takes complete control of the vehicle during the automated valet parking process for the vehicle. Accordingly, the vehicle is prevented from performing an unexpected operation, thereby reducing accidents in the parking lot. However, in some cases, the driving authority may be partially delegated to the infrastructure so that the vehicle can still control some of the vehicle operations, or the driving authority may be shared by the vehicle and the infrastructure. For example, a braking operation needs to be performed when an emergency occurs during the automated valet parking procedure. Therefore, when the vehicle detects a danger with the help of an ADAS sensor, the vehicle applies a brake without the intervention of the infrastructure. In addition, the vehicle checks whether a person or animal remains in the vehicle. Since vehicles are usually parked for long hours in a parking lot, if a person or animal is accidentally left in the vehicle during the parking duration, the person or animal would be in danger. Therefore, it is important to ensure that the vehicle is empty before starting an automated valet parking process. The checking for determining whether a person or animal is present in the vehicle is performed with the help of sensors mounted in the vehicle. When the automated valet parking is finished, the driving authority is automatically returned to the driver from the infrastructure.

An arrival process in which a vehicle enters a parking lot and performs parking in a specific parking spot within the parking lot is similar to a departure process in which a parked vehicle leaves the parking lot. Specifically, the vehicle receives a departure request. The driver (i.e., owner or user of the vehicle) makes the departure request using a communication device, such as smartphone or mobile terminal, which can communicate with the infrastructure. When the driver makes the departure request, the driver transmits vehicle information and driver information to the infrastructure using the communication device. The infrastructure determines whether a target vehicle of the departure request is actually parked in the parking lot on the basis of the received vehicle information and the received driver information and checks whether the driver is a qualified driver. When the vehicle receives the departure request, the vehicle or the infrastructure checks whether a passenger is present in the vehicle. When it is determined that no passenger is present in the vehicle, the next step is performed. When the driver makes the departure request, the driving authority is delegated from the driver to the vehicle or the infrastructure. That is, when the driver sends the departure request, the driver loses the authority to control the vehicle. In this case, the vehicle is self-controlled by a built-in controller or controlled by the infrastructure. For example, the vehicle is controlled by the built-in controller or the infrastructure such that the vehicle doors are locked when the vehicle leaves the parking spot and are unlocked when the vehicle arrives at the pickup area. When the vehicle arrives at the pickup area, the driving authority is returned to the driver from the vehicle or the infrastructure.

However, as described above, there is a case where the driving authority is partially owned by the vehicle rather than the entire driving authority being delegated to the infrastructure, or there is a case where the driving authority of the vehicle is shared by the vehicle and the infrastructure. After receiving the departure request, the vehicle performs operations to pick up the driver and leave the parking lot. That is, the vehicle departs from the parking spot upon receiving a departure signal. To this end, the infrastructure can control the vehicle so that the engine of the vehicle is activated. The infrastructure notifies the driver of the departure of the vehicle from the parking spot.

In step (2), a target position, a guide route, and a driving route are determined. The determination of the target position, the guide route, and the driving route is performed by the infrastructure. The target position, the guide route, and the driving route determined by the infrastructure are transmitted to the vehicle. That is, the target position, the guide route, and the driving route are delivered to the vehicle both at the arrival process and the departure process.

The target position is a final destination to be reached by the vehicle. For example, in a situation in which a vehicle enters a parking lot, the target position may be an empty parking spot in a parking zone of a parking lot. In a different situation in which a vehicle leaves a parking lot, the target position may be an empty parking spot in a pickup area of a parking lot. However, those are only exemplary target positions, and embodiments of the present disclosure are not limited thereto. For example, the target position may be a specific spot in the vicinity of an empty parking spot. For example, when there are several successive empty parking spots in a specific area of a parking lot, the target position may be a specific spot in the vicinity of the specific area. In this case, the vehicle autonomously drives to the specific spot, and the automated parking function of the advanced driver-assistance system (ADAS) mounted in the vehicle is activated so that the vehicle can be parked in a desired parking spot in the vicinity of the specific spot. The automated parking function of the ADAS may be a partially automated parking system (PAPS). In this case, the efficiency of management of the parking capacity of the parking lot can be improved. In this case, it is not necessary for the infrastructure to accurately calculate the target position. That is, only rough estimation for the target position is required. Therefore, it is possible to reduce computing resources for data processing.

The guide route is a path along which the vehicle needs to autonomously drive in the parking lot. The guide route is provided to the vehicle in the form of a series of instructions (for example, "drive 10 meters straight forward", "turn right at the corner", "drive 20 meters straight forward", "turn left", etc.). Alternatively, the guide route is provided to the vehicle in the form of lines including straight lines and curved lines drawn on a parking lot map. The lines indicate a driving lane extending from the current location of the vehicle to the target position. Alternatively, the guide route is composed of multiple waypoints and one target position marked on a parking lot map. For example, the guide route includes three pillars A1, B2, and C3 as the multiple waypoints and a parking slot D23 as the target position. When the guide route is expressed in the form of multiple waypoints and a target position, information on straight and/or curved lines and distances (for example, 10 m) is not required. Therefore, this guide route reduces the amount of information for V2I communication.

According to embodiments of the present disclosure, a vehicle may be provided with a guide route that can safely guide a vehicle to a target position even when an unexpected incident occurs in a parking lot. For example, the unexpected incident may be an event in which a vehicle collides with an object (for example, another vehicle, a person, a wall, a pillar, etc.). In this case, a guide route that is provided to a vehicle to deal with the collision situation is a guide route GP2 shown in FIG. 11. This guide route GP2 is different from a guide route GP1 (see FIG. 9) that is provided to the vehicle in a normal situation. Alternatively, the unexpected incident may be an event in which a vehicle temporarily stops due to the presence of an object within a parking lot. In this case, a guide route that is provided to a vehicle to deal with the temporary stop situation is a guide route GP3 shown in FIG. 13. This guide route GP3 is different from the guide route GP1 (see FIG. 9) that is provided to the vehicle in a normal situation and from the guide route GP2 (see FIG. 11) that is used to deal with the collision situation. According to embodiments of the present disclosure, the guide route GP1, the guide route GP2, and the guide route GP2 may be distinguished by having different patterns. For example, the path to target position of the guide route GP1, the path to target position of the guide route GP2 and the path to target position of the guide route GP3 are the same, but the lighting pattern of the guide route GP1, the lighting pattern of the guide route GP2 and the lighting pattern of the guide route GP3 are different from each other.

One embodiment of the present disclosure, a vehicle may be provided with a guide route that is used when the vehicle arrives at a target position or the vicinity of the target position. In this case, a guide route that is provided to a vehicle to deal with the target position approaching situation is a guide route GP5 shown in FIG. 14. This guide route GP5 is different from the guide route GP1 (see FIG. 9) that is provided to the vehicle in a normal situation, from the guide route GP2 (see FIG. 11) that is used to deal with the collision situation, and from the guide route GP3 (see FIG. 13) that is used to deal with the temporary stop situation. Due to these guide routes, objects within a parking lot can recognize an unexpected incident occurring in the parking lot.

Each of the guide routes may be indicated with lighting devices. The lighting devices may be LED lamps. When the lighting devices illuminate, the guide route is displayed on the ground surface. In this case, the lighting devices are LED lamps that are buried in the ground of the parking lot. Alternatively, the lighting devices may be laser lamps installed on the ceiling, the wall surface, or pillars in a manner that the laser lamps emit a laser beam toward the ground surface of the parking lot. The vehicle detects the light emitted from the lighting devices with built-in sensors, thereby receiving or recognizing the guide route. For example, the vehicle detects the illumination of each of the lighting devices with the use of a front camera sensor.

In step (3), the autonomous driving of the vehicle is performed in the parking lot. The autonomous driving of the vehicle is composed of driving, stopping, and re-driving. The autonomous driving of the vehicle is performed in accordance with the instructions of the infrastructure. Alternatively, the autonomous driving of the vehicle may be performed without relying on the instructions of the infrastructure. The vehicle can autonomously drive to the target position along the guide route that falls within a permitted driving area. During the autonomous driving of the vehicle, the vehicle is controlled to drive at or below a limited speed. This speed limit may be a value transmitted from the infrastructure to the vehicle or may be a value stored in the vehicle. In addition, the vehicle is controlled not to deviate beyond an error margin from the given guide route when driving along the guide route. This preset error margin may be a value transmitted from the infrastructure to the vehicle or may be a value stored in the vehicle. In addition, the vehicle turns with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement is performed. The target of the position measurement may be a vehicle that is performing the autonomous parking operation, any obstacle existing in the parking lot, or another vehicle that is parked in the parking lot. The infrastructure measures the position of the vehicle or the obstacle and stores the measured position in a database. The infrastructure identifies and detects vehicles or obstacles and monitors each of the vehicles in the parking lot for the safety of the vehicles. Specifically, the infrastructure monitors a vehicle that is in the middle of performing autonomous parking at the target position and issues an appropriate instruction with respect to the vehicle. The vehicle can measure its position by itself. In this case, the vehicle transmits the measured position to the infrastructure. The position of the vehicle needs to be inside a predetermined error margin. The predetermined error margin is a value determined by the infrastructure. The vehicle detects obstacles present around the vehicle, measures the positions of the obstacles, and transmits the measured positions of the respective obstacles to the infrastructure. The frequency for communication between the vehicle and the infrastructure may be a predetermined frequency.

In step (5), an autonomous parking operation is performed. The autonomous parking performed in this step refers to an operation in which the vehicle enters an available parking spot after reaching the target position. The vehicle performs autonomous parking by sensing nearby obstacles or other vehicles that are parked therearound, with the help of a distance sensor mounted on the vehicle. Examples of the distance sensor mounted on the vehicle include an ultrasonic sensor, a radar sensor, a LiDAR sensor, and a camera.

In step (6), an emergency braking operation is performed. The emergency braking of the vehicle is performed according to the instruction of the infrastructure or is performed according to its own decision when the vehicle detects an obstacle. The infrastructure instructs the vehicle to apply an emergency brake when it is determined that the surroundings of the vehicle is unsafe. When the infrastructure determines that the surroundings of the vehicle become safe after entering an emergency stop state, the infrastructure instructs the vehicle to resume autonomous driving or autonomous parking. When the vehicle detects an obstacle, the vehicle applies an emergency brake according to its own decision. In this state, the vehicle notifies the infrastructure of the emergency stop event or the type or position of the obstacle which is the cause of the emergency stop. The vehicle reduces its speed according to a predetermined deceleration value that is preset for the emergency braking. This predetermined deceleration value is a value determined by the infrastructure or a value stored in the vehicle. The predetermined deceleration value varies depending on the type of an obstacle, the position of an obstacle, and the distance between the vehicle and an obstacle. The vehicle resumes autonomous driving or autonomous parking upon receiving a restart instruction from the infrastructure. Alternatively, the vehicle resumes the autonomous driving or autonomous parking when the vehicle self-confirms that the obstacle is removed. The vehicle reports the infrastructure of the restart of the autonomous driving or parking and of the removal of the obstacle. The vehicle detects the presence of a person or animal in the vehicle and applies an emergency brake when the presence of a person or animal is detected. The vehicle resumes autonomous parking or driving according to an instruction received from the infrastructure when the vehicle is in an emergency stop state. Alternatively, the vehicle may determine, by itself, whether the cause of the emergency braking is removed and resumes autonomous parking or driving when it is confirmed that the cause of the emergency parking is removed.

In step (7), the automated valet parking procedure ends. After the vehicle completes the autonomous driving and the autonomous parking, the infrastructure issues a control release instruction. The vehicle can activate and deactivate the engine or the power supply according to an instruction received from the infrastructure or without depending on the instruction of the infrastructure. The vehicle can lock and unlock the vehicle doors according to an instruction received from the infrastructure or without depending on the instruction of the infrastructure. The vehicle can apply a parking brake according to an instruction received from the infrastructure or without depending on the instruction of the infrastructure.

In step (8), an error control operation is performed. The error control is performed when an error occurs in communication between the vehicle and the infrastructure and/or when a mechanical fault occurs in the vehicle. The infrastructure checks communication between the infrastructure and the vehicle for an error. The vehicle detects a communication error by monitoring the communication between the infrastructure and the vehicle. The vehicle detects whether a mechanical fault occurs by monitoring operating states of built-in accessories including sensors mounted thereon.

FIG. 5 is a diagram illustrating a communication process performed by a vehicle and an infrastructure for automated valet parking, according to one embodiment of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique number of the vehicle. The vehicle qualification information is transmitted at a stage in which the automated valet parking procedure is started after the vehicle enters a parking lot (see step (1) of FIG. 4A).

In step (2), an automated valet parking preparation instruction is transmitted from the infrastructure to the vehicle. The automated valet parking preparation instruction is transmitted before the vehicle starts its autonomous driving.

In step (3), vehicle information is transmitted from the vehicle to the infrastructure. The vehicle information includes status information and position information of the vehicle. The status information includes whether the vehicle is in a driving state, a parking stop state, or an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (4), an acknowledgment of the vehicle information is transmitted from the infrastructure to the vehicle. The acknowledgment of the vehicle information is transmitted at the same frequency as the transmission of the vehicle information that is transmitted in step (3). Therefore, the acknowledgment of the vehicle information is used as a parameter to determine whether an error has occurred in communication between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (5), a target position and a guide route are transmitted from the infrastructure to the vehicle. The transmission of the target position and the guide route is performed either before or after an automated valet parking start instruction is transmitted from the infrastructure to the vehicle.

In step (6), driving area boundary information is transmitted to the vehicle from the infrastructure. The driving area boundary information includes markings (for examples, lines demarcating parking slots, a central line, and lane boundary lines demarcating a driving lane) that indicate the boundaries of a permitted driving area. The transmission of the driving area boundary information is performed after the automated valet parking preparation instruction is transmitted. This driving area boundary information is transmitted from the infrastructure to the vehicle in the form of a parking lot map.

In step (7), the automated valet parking start instruction is transmitted from the infrastructure to the vehicle. The transmission of the automated valet parking start instruction is performed after the guide route and the driving area boundary information are transmitted. Alternatively, the automated valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The transmission of the vehicle control release instruction is performed after the vehicle is autonomously parked at the designated parking spot.

FIG. 6 is a diagram illustrating a communication process performed between a vehicle 200 and an infrastructure 100 for automated valet parking.

In step (1), the vehicle 200 reaches a parking lot and stops at a predetermined position. This stop position may be at an entrance gate of the parking lot. The vehicle 200 reports its arrival to the infrastructure 100. In step (2), the infrastructure 100 authenticates the number and size of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 provides the vehicle 200 with a notification that the entry of the vehicle 200 into the parking lot is allowed or is not allowed on the basis of the authentication result. For example, the infrastructure 100 displays a message indicating approval or disapproval of the entry of the vehicle into the parking lot on a display panel installed around the stop position. The driver drives the vehicle 200 to a drop-off area within the parking lot when the entry of the vehicle into the parking lot is allowed. In step (7), the driver turns off the ignition of the vehicle 200, gets out of the vehicle 200, locks the vehicle doors, and leaves the drop-off area. In step (8), a driving authority to control the vehicle 200 is delegated from the vehicle 200 (or the driver) to the infrastructure 100. In step (9), the infrastructure 100 notifies the driver that it takes the authority to control the vehicle 200 in the parking lot. Such a notification is sent to a driver's smart device through a mobile communication network.

FIG. 7 is a diagram illustrating a communication process performed between a vehicle 200 and an infrastructure 100 for automated valet parking.

In step (1), the infrastructure 100 transmits an engine activation request to the vehicle 200. In step (2), the vehicle 200 activates the engine at the request transmitted from the infrastructure 100. In step (3), the vehicle 200 activates the engine and then notifies the infrastructure 100 that the engine is activated. In step (4), the infrastructure 100 transmits an automated valet parking preparation request to the vehicle 200. In step (5), the vehicle 200 transmits a reply with respect to the automated valet parking preparation request. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed, to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes marking information. In step (10), the vehicle 200 estimates or calculates the position of the vehicle 200 on the basis of the transmitted marking information, and the vehicle 200 transmits the estimated position of the vehicle 200 to the infrastructure 100. In step (11), the infrastructure 100 determines a target position (for example, parking spot). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

FIG. 8 is a block diagram illustrating a method of providing a guide route, the method being performed by a vehicle and an infrastructure, according to one embodiment of the present disclosure. FIGS. 9 and 14 are diagrams illustrating guides according to one embodiment of the present disclosure. Specifically, FIG. 9 illustrates a guide route for guiding a vehicle to the immediate vicinity of a target position, and FIG. 14 illustrates a guide route for guiding the vehicle into the target position from the immediate vicinity. Operations described below relate to steps (1) through (3) shown in FIG. 4A.

Referring to FIG. 8, in step (1), a vehicle 800 makes a request for a guide route and waits until receiving a guide route. According to one embodiment, the vehicle passes the entrance of a parking lot, makes a temporary stop, and requests for an infrastructure 810 setting a guide route. The setting of a guide route may mean a process of allocating a guide route for dealing with an unexpected incident for the vehicle 800. For example, the vehicle 800 may request for the setting of a guide route by generating a predefined signal (for example, flashing with a turn signal lamp) in a state of stopping at the entrance of a parking lot.

In step (2), the infrastructure 810 provides an available guide route to the vehicle 800. According to an embodiment, the infrastructure 810 provides the vehicle 800 with one of guide routes that are not allocated for other vehicles.

In step (3), the vehicle 800 provides a completion signal indicating completion of the guide route setting to the infrastructure 810. According to one embodiment, the guide route may be provided at a position at which the guide route can be detected by the sensors mounted on the vehicle 800. The vehicle 800 provides the completion signal by generating a predefined signal (for example, flashing with a turn signal lamp) when detecting the guide route. According to various embodiments, the infrastructure 810 and the vehicle 800 may set guide routes for dealing with various unexpected incidents by repeating the above-described setting operation.

In step (4), the infrastructure 810 provides a guide route to the vehicle 800 and instructs the vehicle 800 to start moving. According to one embodiment, the infrastructure 810 provides a guide route GP1 for guiding the vehicle A to an adjacent area to a target position TP that is an available parking position, as illustrated in FIG. 9. For example, the guide route GP1 may be a complete mark that continuously extends to indicate a complete way from the location A of the vehicle to the target position P or may be a partial mark that extends only a partial distance of the complete way from the location A to the target position TP.

In step (5), the vehicle 800 moves to the target position along the guide route provided by the infrastructure 810.

In step (6), the infrastructure 810 detects an unexpected incident occurring in the parking lot. For example, the unexpected incident may be an event in which a vehicle collides with an object (for example, another vehicle, a person, a wall, a pillar, etc.). Alternatively, the unexpected incident may be an event in which a vehicle temporarily stops due to the presence of an object within a parking lot. According to one embodiment, the infrastructure 810 detects an unexpected incident by identifying and detecting the vehicle 800 or an object (or obstacle) and by monitoring the safety of each of a plurality of vehicles within the parking lot. According to another embodiment, the infrastructure 810 receives sensing information from at least one vehicle (for example, vehicle 800 or another vehicle) existing in the parking lot in order to detect an unexpected incident.

In step (7), the infrastructure 810 provides a guide route for dealing with an unexpected incident. According to one embodiment, the infrastructure 810 provides a guide route for dealing with a collision situation when detecting a collision of the vehicle 800, as described below with reference to FIGS. 10 and 11. According to another embodiment, the infrastructure 810 provides a guide route for dealing with a temporary stop situation when detecting a temporary stop of the vehicle 800, as described below with reference to FIGS. 12 and 13.

In step (8), the vehicle 800 performs an operation indicated by the guide route and then moves to the target position. According to one embodiment, the vehicle 800 temporarily stops and waits until a problem caused by the unexpected incident is solved.

In step (9), the infrastructure 810 detects the vehicle 800 approaching the target position. According to one embodiment, the infrastructure 810 determines an event in which the vehicle 800 enters the target position by monitoring the movement of the vehicle 800. The infrastructure 810 receives sensing information from at least one vehicle (for example, vehicle 800 or another vehicle) existing in the parking lot in order to monitor the movement of the vehicle 800.

In step (10), the infrastructure 810 provides a guide route for dealing with an entry into the target position. According to one embodiment, as illustrated in FIG. 14, when detecting a situation C3 in which the vehicle A is about to enter the target position TP, the infrastructure 810 provides a guide route GP5 for guiding the entry of the vehicle 800 into the target position TP. The guide route GP5 has a different pattern from the guide route GP1 (see FIG. 9) that guides the vehicle 800 until reaching an adjacent area to the target position TP. For example, the pattern may include at least one of an illumination color, an illumination pattern, an illumination period, a count of illumination operations, and an illumination area. By varying the pattern, it is possible to instruct the vehicle 800 to start performing an autonomous parking operation or to inform other vehicles that the vehicle 800 begins a parking operation.

In step (11), the vehicle 800 performs an autonomous parking operation according to the guide route.

FIG. 10 is a block diagram illustrating a method of providing a guide route, the method being performed by a vehicle and an infrastructure, according to one embodiment of the present disclosure. FIG. 11 is a diagram illustrating a guide route for dealing with a collision event, according to one embodiment of the present disclosure. Operations described below relate to steps (6) through (8) shown in FIG. 8.

Referring to FIG. 10, in step (1), the infrastructure 810 determines a region of interest (ROI) depending on the location of the vehicle 800. According to one embodiment, the ROI may have a size equal to or larger than the size of the vehicle 800.

In step (2), the infrastructure 810 determines a potentially dangerous object among objects located in the ROI. The term "potentially dangerous object" refers to an object having a high risk of colliding with the vehicle 800. The infrastructure 810 calculates an estimated collision time that takes for the vehicle 800 to collide with each object located in the ROI and determines an object for which the estimated collision time is shorter than a critical time.

In step (3), the infrastructure 810 detects a collision between a potentially dangerous object and the vehicle. According to one embodiment, the infrastructure 810 determines a collision between the vehicle 800 and each potentially dangerous object by monitoring the movements of the vehicle 800 and the potentially dangerous objects.

In step (4), the infrastructure 810 provides a guide route for dealing with a collision event. According to one embodiment, as illustrated in FIG. 11, when detecting a situation C1 in which the vehicle A collides with another vehicle, the infrastructure 810 provides a guide route GP2 having a different pattern from the guide route GP1 (see FIG. 1) that guides the vehicle to an adjacent area to the target position TP.

In step (5), the vehicle 800 waits until the collision situation is resolved.

FIG. 12 is a block diagram illustrating a method of providing a guide route, the method being performed by a vehicle and an infrastructure according to one embodiment of the present disclosure. FIG. 13 is a diagram illustrating a guide route for dealing with a temporary stop situation, according to one embodiment of the present disclosure. Operations described below relate to steps (6) through (8) shown in FIG. 8.

Referring to FIG. 12, in step (1), the infrastructure 810 determines a region of interest (ROI) depending on the location of the vehicle 800. According to one embodiment, the ROI may have a size equal to or larger than the size of the vehicle 800.

In step (2), the infrastructure 810 determines a potentially dangerous object among objects located in the ROI. A potentially dangerous object is an object having a high risk of colliding with the vehicle 800. The infrastructure 810 calculates an estimated collision time that takes for the vehicle 800 to collide with each object located in the ROI and determines an object for which the estimated collision time is shorter than a critical time.

In step (3), the infrastructure 810 detects a temporary stop situation due to the presence of a potentially dangerous object. According to one embodiment, the infrastructure determines the occurrence of a collision between the vehicle 800 and the potentially dangerous object by monitoring the movements of the vehicle 800 and the potentially dangerous object. For example, the infrastructure 810 detects a situation in which the vehicle 800 stops for a specified time while an object exists in the ROI.

In step (4), the infrastructure 810 provides a guide route for dealing with a temporary stop situation. According to one embodiment, as illustrated in FIG. 13, when detecting a situation C2 in which a vehicle exists on the driving path of the vehicle A, the infrastructure 810 provides a guide GP3 for dealing with a temporary stop situation. In addition, the infrastructure 810 outputs a guide route GP4 that is a detour path leading to the target position. These guide routes GP3 and GP4 may also have a different pattern from the guide route GP1 (see FIG. 9) like the guide route GP2.

In step (5), the vehicle 800 waits until the temporary stop situation is resolved or the vehicle 800 moves to the target position along the detour route.

In one or more exemplary embodiments, the described functions may be implemented with hardware, software, firmware, or any combination thereof. When implemented with software, these functions may be stored on or transmitted to a computer-readable medium in the form of one or more instructions or codes. The computer-readable medium refers to any medium that is used to easily transfer a computer program from one computer to another. For example, it may be a communication medium or a computer-readable storage medium. The storage medium may be an arbitrary medium that can be accessed by a computer. The computer-readable media include, but are not limited to, RAMs, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from websites, servers or, other remote sources through a cable or over a wireless channel. Examples of the cables include coaxial cable, fiber optic cable, twisted pair cable, and digital subscriber line (DSL), and the wireless channel uses infrared frequency waves, radio frequency waves, or ultra-high frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit by transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary embodiments. Of course, the above-described embodiments do not cover all possible combinations of components and/or methods to implement the present disclosure. Thus, those skilled in the art will appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprise" used in the detailed description or the appended claims, it is noted that it is similarly interpreted as "comprising" that is used as a transitional word in the claims.

As used herein, the terms "infer" and "inference" generally refer to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An operation method of an infrastructure supporting an automated valet parking service, the method comprising:
    initiating an automated valet parking procedure by the infrastructure, the infrastructure comprising a parking facility or a control center for controlling operation of the parking facility;
    providing, by the infrastructure, a vehicle with a target position and a first guide route that guides the vehicle to the target position;
    detecting, by the infrastructure, an unexpected incident based on situation information while the first guide route is provided to the vehicle; and
    providing, by the infrastructure, the vehicle with a second guide route to deal with the unexpected incident,
    wherein initiating the automated valet parking procedure comprises:
        delegating, by the vehicle, driving authority for the vehicle to the infrastructure, and
    wherein the driving authority includes authority to control a steering operation, an accelerating operation, and a braking operation.

2. The method according to claim 1, wherein the second guide route is different from the first guide route.

3. The method according to claim 1, further comprising:
    providing the vehicle with a third guide route alerting the vehicle that the vehicle arrives at the target position by detecting that the vehicle approaches the target position.

4. The method according to claim 3, wherein the third guide route is different from the first guide route and from the second guide route.

5. The method according to claim 1, further comprising:
    receiving a request from the vehicle before providing the vehicle with the second guide route to deal with the unexpected incident.

6. The method according to claim 1, wherein the unexpected incident includes at least one of an event in which the vehicle collides with an object or an event in which the vehicle is stopped by the object.

7. The method according to claim 1, wherein the method comprises:
    implementing at least one of the first guide route, the second guide route, or the third guide route with lighting devices installed in a parking lot.

8. The method according to claim 1, wherein providing the vehicle with the second guide route comprises:
    providing the vehicle with a fourth guide route including a detour route leading to the target position.

9. An automated valet parking method comprising:
    initiating an automated valet parking procedure by the infrastructure, the infrastructure comprising a parking facility or a control center for controlling operation of the parking facility;

providing, by an infrastructure, a vehicle with a target position and a first guide route that guides the vehicle to the target position;

performing, by the vehicle, autonomous driving toward the target position along the first guide route;

detecting, by the infrastructure, an unexpected incident based on situation information while the first guide route is provided to the vehicle;

providing, by the infrastructure, a second guide route to the vehicle to deal with the unexpected incident; and performing, by the vehicle, an operation corresponding to the second guide route, wherein initiating the automated valet parking procedure comprises:
delegating, by the vehicle, driving authority for the vehicle to the infrastructure, and wherein the driving authority includes authority to control a steering operation, an accelerating operation, and a braking operation.

10. The method according to claim 9, wherein the second guide route is different from the first guide route.

11. The method according to claim 9, further comprising:
providing, by the infrastructure, the vehicle with a third guide route alerting the vehicle that the vehicle enters the target position by detecting that the vehicle approaches the target position.

12. The method according to claim 11, wherein the third guide route is different from the first guide route and from the second guide route.

13. The method according to claim 9, further comprising:
receiving a request from the vehicle before providing the vehicle with the second guide route to deal with the unexpected incident.

14. The method according to claim 9, wherein the unexpected incident includes at least one of an event in which the vehicle collides with an object or an event in which the vehicle is stopped by the object.

15. The method according to claim 11, wherein the method comprises:
implementing at least one of the first guide route, the second guide route, or the third guide route with lighting devices installed in a parking lot.

16. The method according to claim 15, wherein the method comprises:
performing an illumination by an LED lamp buried under a ground of the parking lot.

17. The method according to claim 9, wherein providing the second guide route comprises:
providing the vehicle with a fourth guide route including a detour route leading to the target position.

18. The method according to claim 11, wherein the method comprises:
detecting, by the vehicle, at least one of the first guide route, the second guide route, or the third guide route.

19. The method according to claim 18, wherein detecting the at least one of the first guide route, the second guide route, or the third guide route comprises:
detecting, by a sensor of the vehicle including a camera sensor, the at least one of the first guide route, the second guide route, or the third guide route.

* * * * *